United States Patent
Gaurat et al.

(10) Patent No.: US 11,131,411 B2
(45) Date of Patent: Sep. 28, 2021

(54) FLUID CONNECTION DEVICE

(71) Applicant: HUTCHINSON, Paris (FR)

(72) Inventors: Flavien Gaurat, Migneres (FR); Robin Milandre, Ferrieres en Gatinais (FR); Cyril Amaru, Varennes Changy (FR); Julien Mongendre, Chapelle Saint Mesmin (FR)

(73) Assignee: HUTCHINSON, Paris (FR)

( * ) Notice: Subject to any disclaimer, the term of this patent is extended or adjusted under 35 U.S.C. 154(b) by 257 days.

(21) Appl. No.: 16/265,859

(22) Filed: Feb. 1, 2019

(65) Prior Publication Data

US 2019/0242508 A1 Aug. 8, 2019

(30) Foreign Application Priority Data

Feb. 2, 2018 (FR) ...................................... 1850911

(51) Int. Cl.
- *F16L 37/088* (2006.01)
- *F16L 37/14* (2006.01)
- *F16L 37/084* (2006.01)

(52) U.S. Cl.
CPC ......... *F16L 37/0885* (2019.08); *F16L 37/088* (2013.01); *F16L 37/0841* (2013.01);
(Continued)

(58) Field of Classification Search
CPC ... F16L 37/144; F16L 37/088; F16L 37/0885; F16L 37/0841; F16L 37/1225; F16L 37/138; F16L 2201/10
(Continued)

(56) References Cited

U.S. PATENT DOCUMENTS

| 5,749,606 A * | 5/1998 | Lu ....................... F16L 37/0885 285/321 |
| 2009/0008928 A1* | 1/2009 | Binder ................ F16L 37/0885 |

(Continued)

FOREIGN PATENT DOCUMENTS

| EP | 2251581 A1 | 11/2010 |
| EP | 3179148 A1 | 6/2017 |

(Continued)

OTHER PUBLICATIONS

Rapport de Recherche Preliminaire dated Sep. 17, 2018, issued in priority French Application No. 1850911, filed Feb. 2, 2018, 2 pages.

*Primary Examiner* — Zachary T Dragicevich
(74) *Attorney, Agent, or Firm* — Christensen O'Connor Johnson Kindness PLLC

(57) ABSTRACT

A fluid connection device generally includes a male connector and a female connector configured to be co-inserted along an axis X, an elastically-deformable pin with a general U or C shape mounted on the female connector, the pin having one part passing through the female connector and configured to cooperate by elastic snap-fitting with the male connector, and a ring axially movable on the female connector between a pin release position and a locking position. In the device, the female connector may support elements that are radially mobile between a first radial position, for example, internal, whereby the ring is immobilized on the female connector, and a second radial position, for example, external, whereby the ring is released. The elements are generally configured to cooperate both with the male connector and the ring to release the ring when the pin is snap-fitted on the male connector.

16 Claims, 6 Drawing Sheets

(52) U.S. Cl.
CPC ........... *F16L 37/144* (2013.01); *F16L 37/084* (2013.01); *F16L 2201/10* (2013.01)

(58) Field of Classification Search
USPC ........................................................ 285/321
See application file for complete search history.

(56) References Cited

U.S. PATENT DOCUMENTS

| | | | | |
|---|---|---|---|---|
| 2013/0009393 A1* | 1/2013 | Hartmann | ........... | F16L 37/0885 |
| 2013/0140808 A1* | 6/2013 | Bongiorni | ........... | F16L 37/0885 |
| 2015/0338007 A1* | 11/2015 | Brimble | ................. | F16L 37/14 |
| | | | | 285/321 |

FOREIGN PATENT DOCUMENTS

| | | | | |
|---|---|---|---|---|
| FR | 2795156 B1 | 8/2001 | | |
| WO | 2011108728 B1 | 9/2011 | | |
| WO | WO-2014175401 A1 * | 10/2014 | ............ | F16L 37/144 |

\* cited by examiner

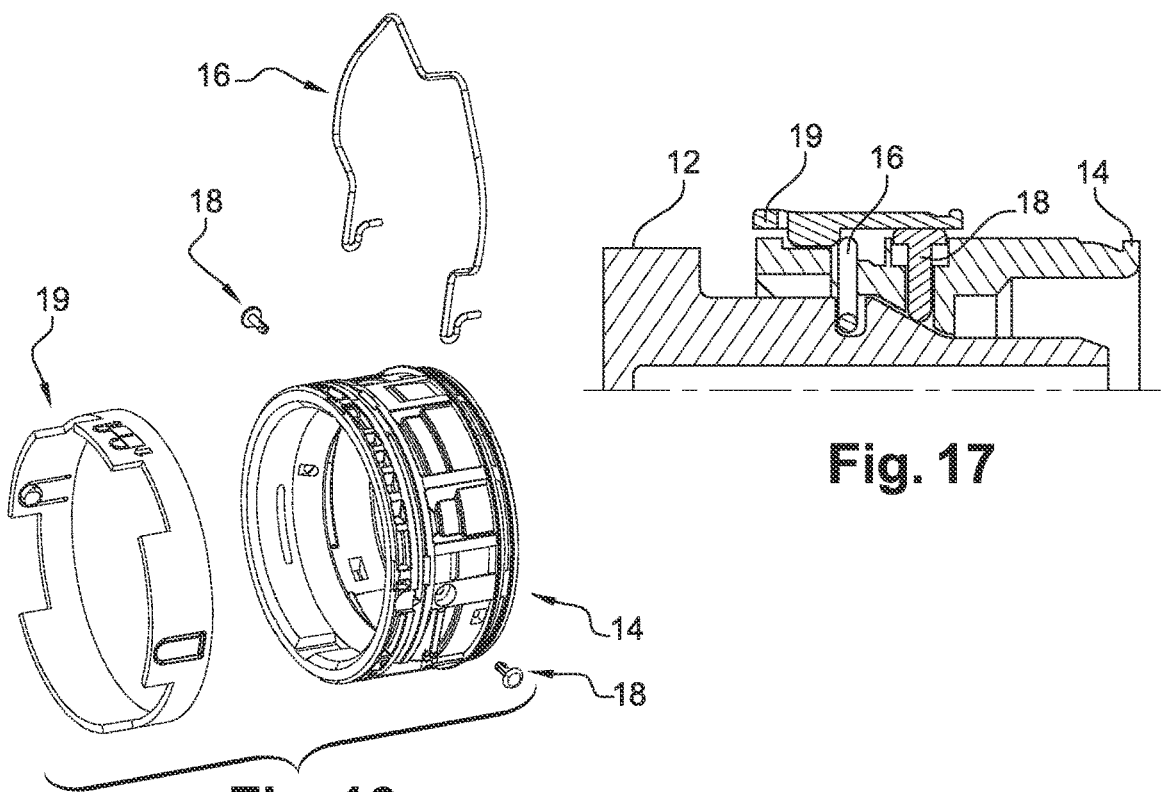
Fig. 17
Fig. 16
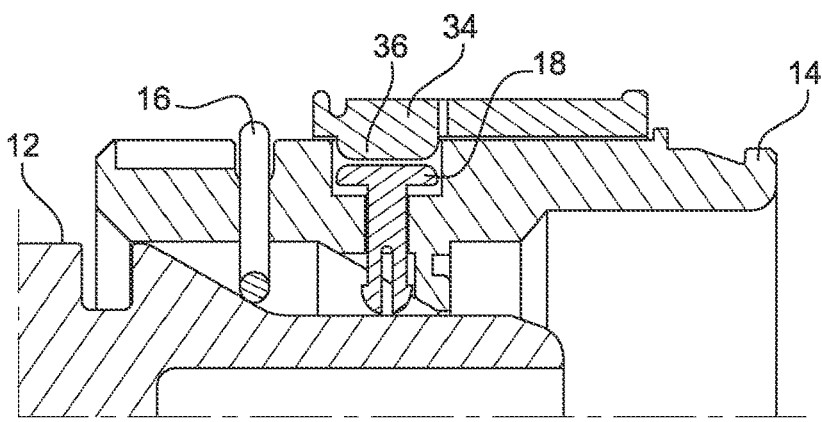
Fig. 18
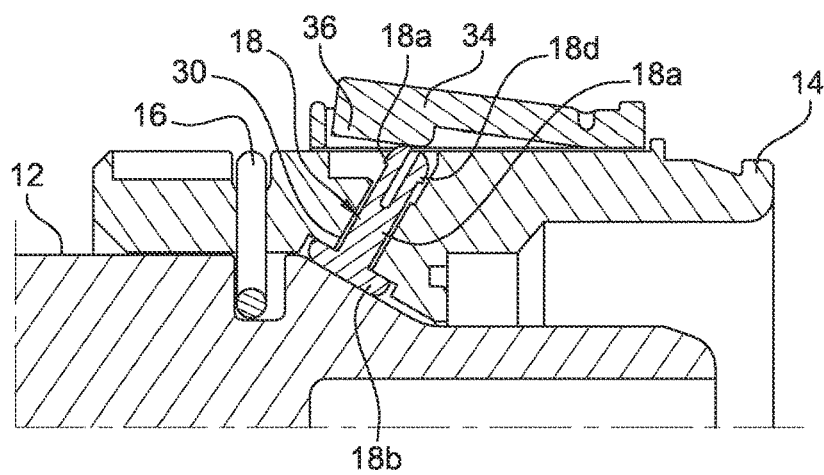
Fig. 19

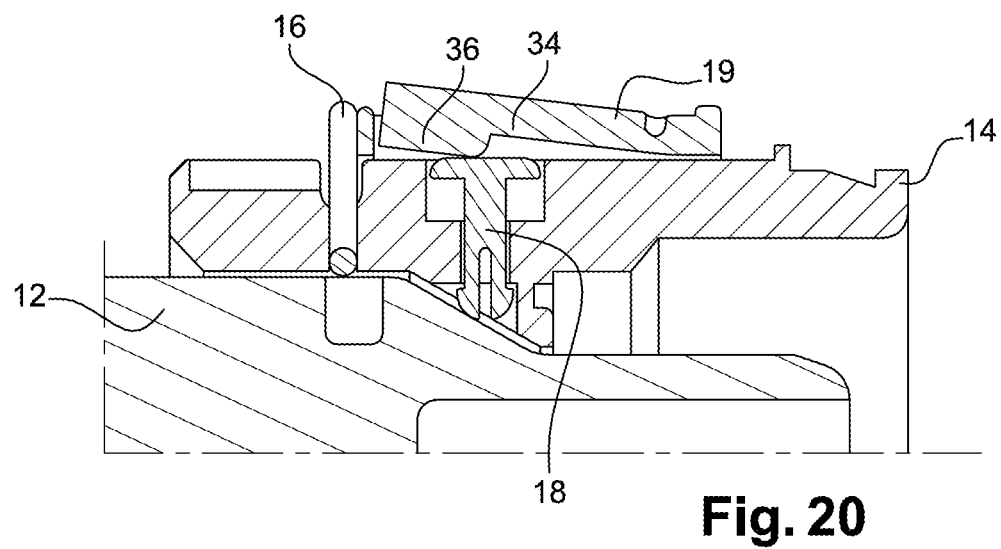
Fig. 20
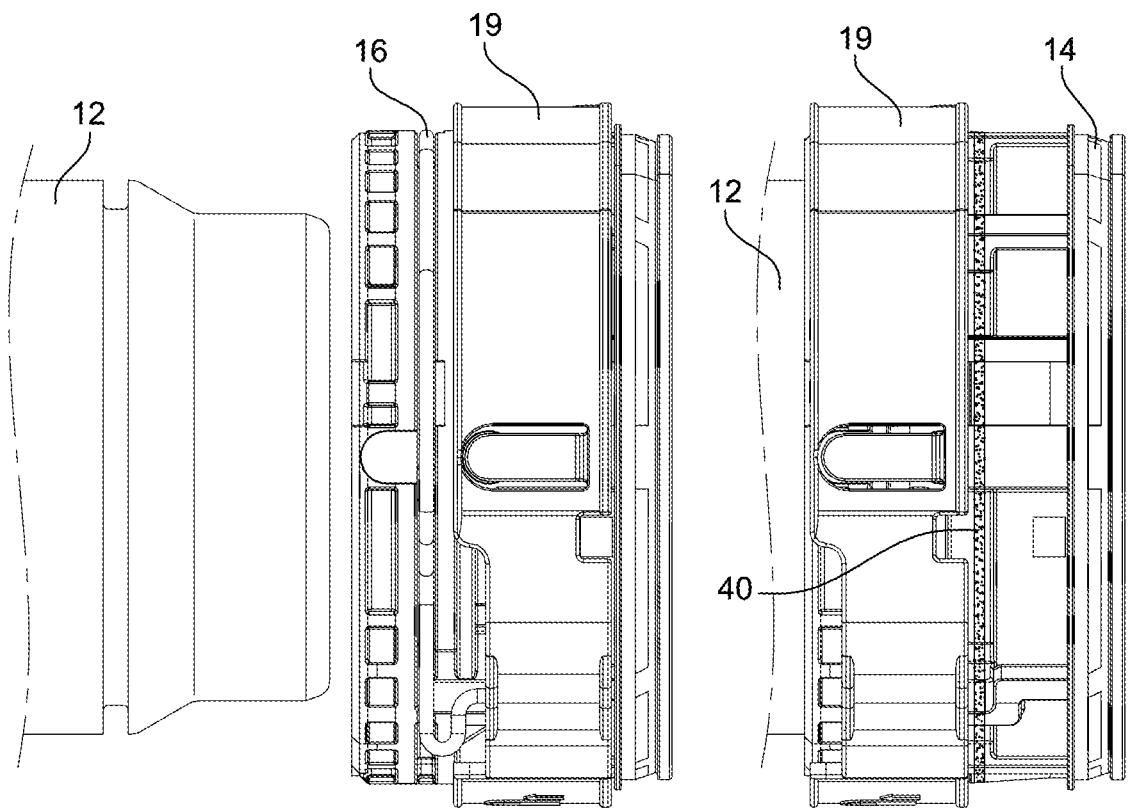
Fig. 21     Fig. 22

FLUID CONNECTION DEVICE

BACKGROUND

The purpose of a fluid connection device, of the quick-connect type, is to connect two interfaces or two connectors to one another, in a sealed, quick, accurate and reliable manner. This operation must be completed in a matter of seconds, and an operator must be able to check that a proper connection is established between the connectors to prevent any subsequent fluid leakage from the device. Furthermore, this type of device is preferably removable and installable depending on specific needs, for example during maintenance operations.

A device of this type is described in document FR-B1-2 795 156. Such a device generally comprises two tubular connectors, respectively male and female, designed to be inserted into one another. The device includes a staple or an elastic pin designed to straddle the female connector and that features two elastically deformable side portions that are inserted in the two openings of the female connector in order to cooperate, by elastic snap-fitting, with the male connector. To facilitate the connection, the pin is preassembled on the female connector, into which the male end is then inserted. This insertion causes the portions of the pin to move apart from one another, the portions then resuming their initial position when the ends are in a predetermined position of insertion. In practice, in this initial position, the pin can be in a constrained state whereby it stays tightly secured to the female connector. The operator in charge of assembly operations can be certain that the connection is suitable when the two elastic portions resume their initial positions, as this causes a characteristic clicking sound that the operator is able to hear.

However, an audible indicator may not be heard by the operator if it is drowned out by background noise. For these reasons, the device can be fitted with an additional means, for example visual, which enable checking that a suitable connection has been established, in addition to the characteristic sound emitted upon the connection.

Document EP-B1-2 251 581 discloses such a visual indicator, associated with the pin in the female connector. In some examples, visual locking indicators do not ensure that the operator working on the assembly line of automotive vehicles has, in fact, carried out a dual control, and the visual control may not be efficient if the quick-connect system to be locked is located in an area that is not easy to see by the operator ("blind" assembly). In such instances, visual indicators may not be fully effective.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A fluid connection device, for example for an automotive vehicle, is generally used in particular for fluid circuits installed in an engine compartment (for example air or water circuits) or under the body of a vehicle (for example a fuel circuit or a selective catalytic reduction or "SCR" circuit). In an alternative version, it can be used in another field, for example in aeronautics, in marine applications, etc.

In accordance with one or more aspects of the present disclosure, there is provided a fluid connection device suitable for use in an automotive vehicle. The fluid connection device generally includes:

a male connector and a female connector, configured to be inserted into one another (co-inserted) along an axis X, an elastically-deformable pin with a general U or C shape mounted on the female connector, the pin comprising at least one part intersecting with the female connector and configured to cooperate by elastic snap-fitting with the male connector, and a movable ring that is displaced axially on the female connector, from a pin release position to a locking position of the pin and of the connectors.

The fluid connection device may further include the female connector supporting mobile elements displaced radially from a first radial position, for example, internal, whereby the ring is immobilized on the female connector, to a second radial position, for example, external, whereby the ring is released, the elements being configured to cooperate both with the male connector and the ring so as to release the ring when the pin is snap-fitted onto the male connector.

The device according to the present disclosure may include two locking means for the connection of the connectors, on one hand with the elastic pin, and on the other hand with the ring. The ring is able to be moved by the operator, from its release position to its locking position, only when the elements are in a predetermined radial position. This radial position of the elements is achieved when the male connector is properly inserted in the female connector, i.e. when the pin is in its snap-fitted position, or co-inserted. In other words, the operator will only be able to move the locking ring of the pin if the pin is in its snap-fitted position. To prevent an operator from moving the ring on the female connector, before the complete insertion of the connectors, the ring is preferably configured to cooperate with the female connector to prevent such a movement when the elements are not in the abovementioned second radial position. Furthermore, the pin is advantageously designed so that, when it is neither in its snap-fitted position, nor in its initial position on the female connector, it prevents the ring from moving from its release position to its locking position.

The elements are advantageously independent from the female connector, since they are not connected by matter or made of a single part with the female connector. This is particularly advantageous for two reasons: the first relates to the fact that they can be made of a different material than that of the female connector, the material being selected based on the specific requirements relating to the use of these elements; the second reason relates to the great positioning accuracy of the elements during their displacement, as these displacements do not cause the deformation of the material, which is advantageous in terms of the lifespan of the device.

In accordance with one or more aspects of the present disclosure, the device may include one or several of the following features, taken individually or in combination:

the elements may be locating pins that feature, for example, a general shape of a nail or of a dumbbell, the elements may be provided on the female connector, the locating pins may have axes of elongation that extend radially with respect to the axis X, the locating pins each may have a head configured to cooperate with the ring and a tip configured to cooperate with the male connector, or conversely, the pin may be configured to limit the motion of the ring on the female connector, when the pin is not in a snap-fitted position, and when the elements are in the second position, the male connector may comprise a cylindrical portion connected to a small, or minor, diameter end of a frustoconical ramp, having a greater diameter end connected to an annular groove, the pin being configured to cooperate by sliding with the ramp and by elastic snap-fitting with the groove, and the elements being configured to cooperate by sliding with the ramp, the ring may comprise locking tabs that are elastically deformable, from a free unconstrained position whereby they axially block the ring on the female connector, to a position of constraint by the elements, whereby they permit the displacement of the ring on the female connector, the tabs may feature an elongated shape along the axial direction, the locking tabs comprise, at their free ends, skids that may be housed with the heads of the locating pins in housings that feature a shape that fits with the female connector, and that are radially movable in these housings, the pin and the elements are at an axial distance that may be less than the length of the ring, the latter being less than the length of the female connector, the ring may be configured to be able to cover and conceal the pin and the elements, in particular when they are in the locking position, the female connector may comprise a visual mark and the ring is configured to be able to cover and conceal this visual mark, in particular when it is in the release position; this visual mark is for example a colour mark, an engraved mark, a symbol, text, etc., the pin may be formed by an elastic element, such as a metal or plastic wire.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 16 is an exploded schematic perspective view of another embodiment of a fluid connection device according to aspects of the present disclosure;

FIG. 17 is a schematic partial cross-section view of the device of FIG. 16, the connectors being in an inserted position;

FIGS. 18 to 20 are partial schematic and axial cross-section views of other embodiments of the device according to aspects the present disclosure; and FIGS. 21 and 22 are schematic side views of another embodiment of the device according to aspects of the present disclosure in a disconnected position and in a connected position, respectively.

DETAILED DESCRIPTION

Figure 1:
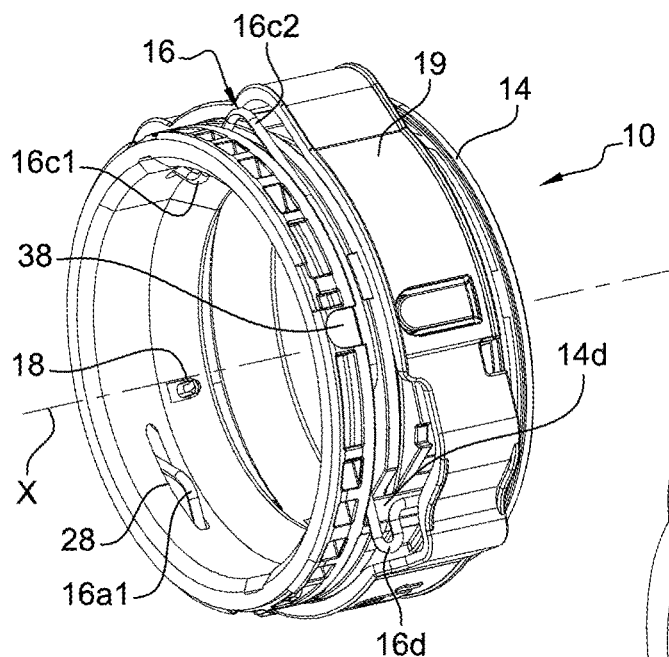
FIGS. 1 and 2 are schematic and perspective views of an embodiment of a fluid connection device according to aspects of the present disclosure, respectively without the male connector in FIG. 1, and with the male connector in FIG. 2, FIGS. 1 and 2 further showing respectively the release and immobilized positions of a ring.
Figure 2:
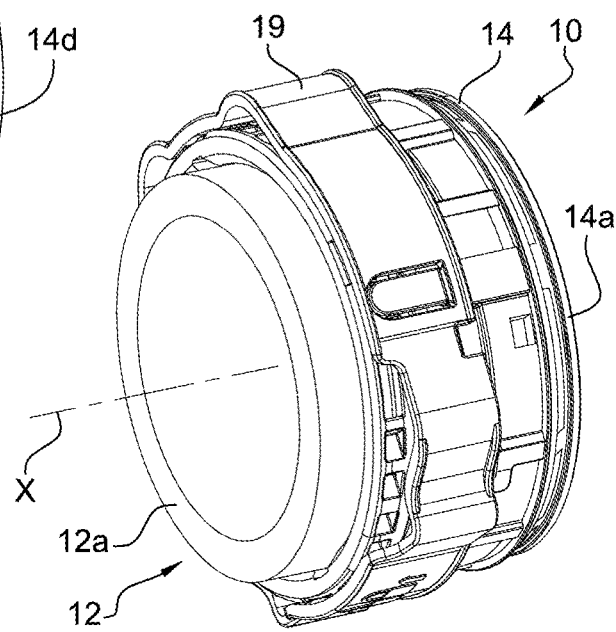

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

FIGS. 1-15 show a first embodiment of a fluid connection device 10 according to the present disclosure, for example for a fluid circuit of an automotive vehicle.

In some embodiments, the device 10 comprises at least five parts, which are a male connector 12, a female connector 14, an elastic pin 16, at least one element, which is a locating pin 18 in the featured example, and a ring 19.

The connectors 12 and 14 are designed to be inserted into one another, i.e., co-inserted, and to be individually secured to a pipe or a component to be connected. The pin 16 and the locating pin(s) 18 are supported by the female connector 14 and are able to cooperate with the male connector 12. The ring 19 is also supported by the female connector 14.

These parts are described individually below, and their mutual cooperation and the insertion of the connectors are described.

The male connector 12 has a tubular form along an axis X. It is designed to be inserted, at least partially, in the female connector 14 and comprises an axial end 12a for securing it to a pipe or a component, as mentioned above.

The male connector 12 is designed to cooperate with the female connector 14, and in particular with the pin 16 it carries, by elastic snap-fitting and comprises, for this purpose, a radially external annular groove 20 in which the pin 16 is designed to be housed, at least partially, when the connectors are correctly positioned one inside the other.

In the featured example, the male connector 12 essentially comprises two cylindrical portions 12b, 12c of different diameters and connected to one another by a frustoconical ramp 22 (external) that extends around the axis X. The portion 12c has the smallest diameter and defines the free end of the connector 12, and is connected to the end with the smallest diameter of the ramp 22, of which the end with the greatest diameter is connected to the end of the portion 12b, which has the greatest diameter. The opposite end of this portion 12b defines the abovementioned axial end 12a.

The groove 20 is located on the portion 12b with the greatest diameter, and is in this case located closest to the ramp 22. In the drawings, the diameter of the portion 12b, which is the external diameter of the groove 20, is referenced D1, the diameter of the portion 12c is referenced D2, and the internal diameter of the groove 20 is referenced D3. D1 is greater than D2, and D3 is greater than D2.

The male connector 12 is for example made of polyamide or aluminium.

The female connector 14 has a tubular form along an axis X. It comprises an axial end 14a for securing it to a pipe or a component, as mentioned above.

The female connector 14 is configured to extend around the male connector and therefore comprises an inner axial boring adapted to the shape and dimensions of the male connector 12.

In the featured example, on the side opposite the end 14a, the female connector 14 comprises a cylindrical portion 14b that is connected to an end with a greater internal diameter of a frustoconical ramp 24 (internal) extending about the axis X and of which the end with the smallest diameter is located on the side of the end 14a. As is seen in particular in FIG. 6, the portion 14b is configured to extend with a small radial clearance around the portion 12b, and the ramp 24 is configured to also extend axially with a small radial clearance around the ramp 22.

In practice, the portion 14b has an internal diameter referenced D4 that is slightly greater than D1 and the ramps 22, 24 can feature substantially identical cone angles. The ramp 24 has a minimal internal diameter referenced D5, which is slightly greater than the diameter D2.

The female connector 14 supports the ring 19, the pin 16 and the two locating pins 18 in the featured example.

The connector 14 is for example made of polyamide.

Figure 7:
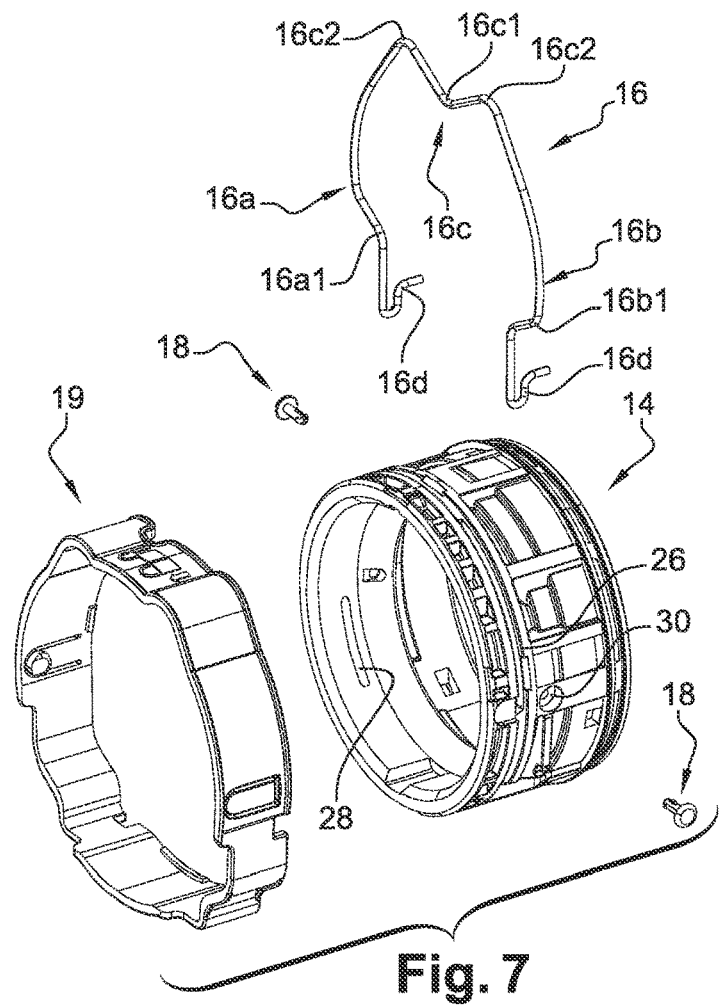
FIG. 7 is an exploded schematic perspective view of the device of FIG. 1.

The pin 16 is better seen in FIG. 7. It has a general U or C shape and is formed by an elastic element such as a metal wire. It comprises two side portions 16a, 16b connected to one another by a middle portion 16c.

The pin 16 is mounted on the connector 14 and around a part of the latter. As can be seen specifically in FIGS. 3 to 7, the connector 14 comprises an annular groove 26 that opens radially outwards and in which the pin 16 is housed.

The curved portions of the pin extend along a circumference centred on the axis X. Other portions move away from this circumference. This is the case, in particular, for the middle portion 16c, which features a general M shape and comprises two side parts 16c2 oriented outwards, and a middle part 16c1 oriented inwards. This is also the case for the side portions that each comprises, in the vicinity of its free end, a part 16a1, 16b1 oriented inwards. Furthermore, the free ends 16d of the side portions are folded.

Figure 5:
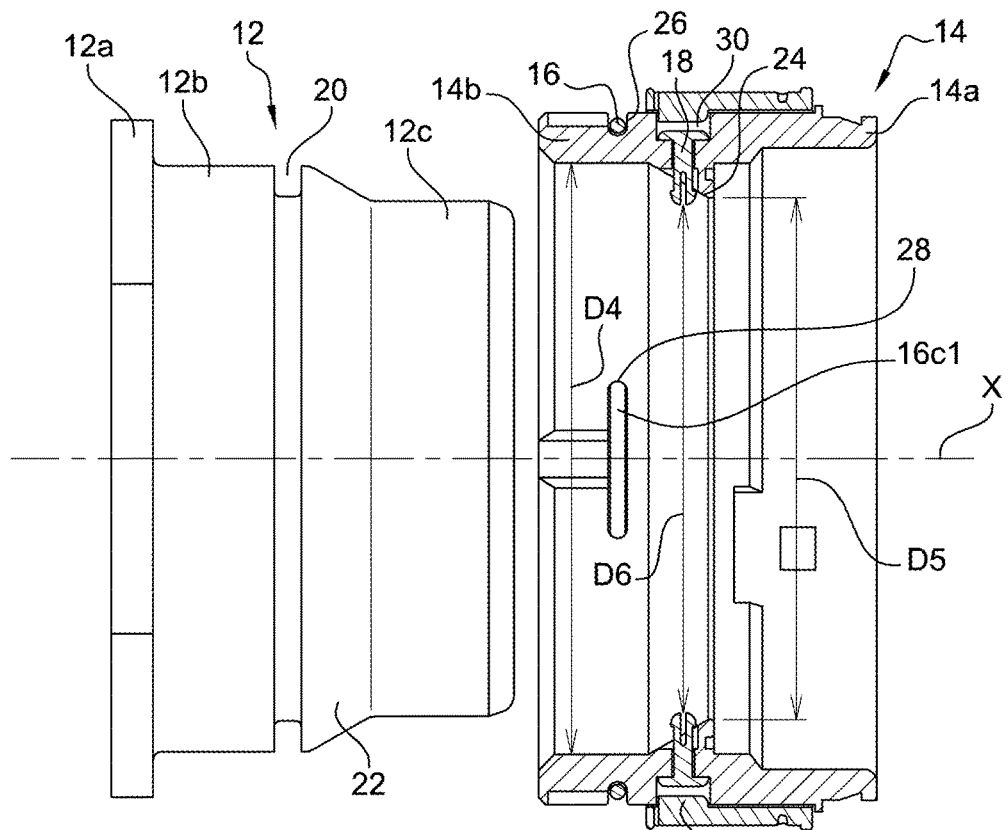
FIG. 5 is a schematic side view and a partial axial cross-section view of the device of FIG. 1, the male connector being showed but at a distance from the female connector; the device is therefore in a non-connected state.
Figure 6:
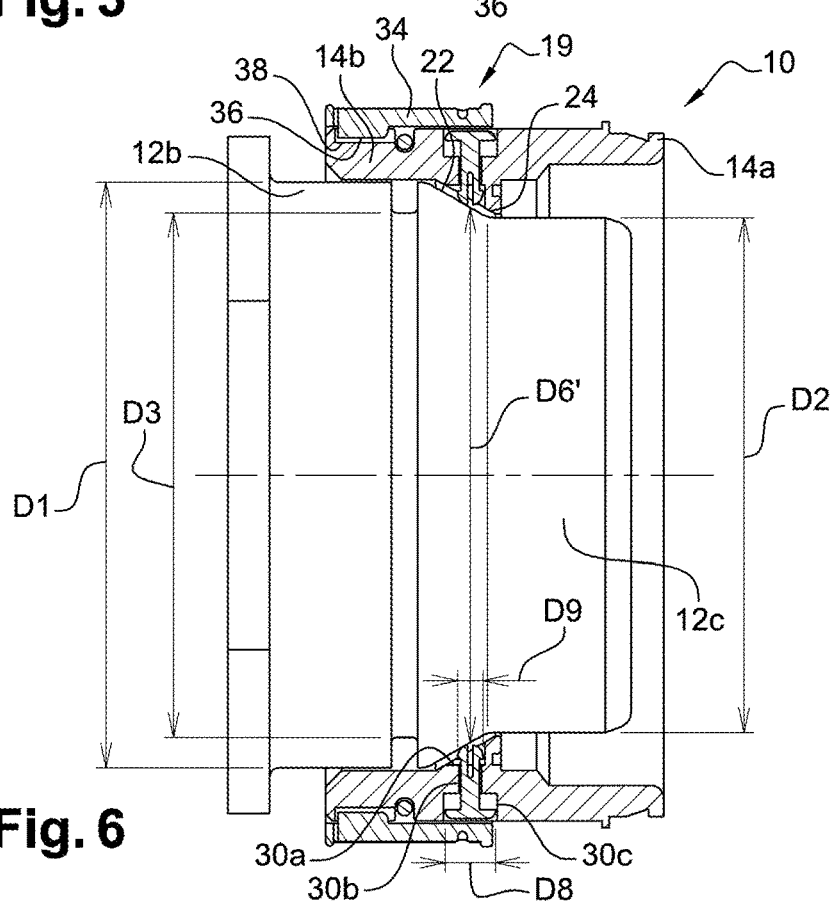
FIG. 6 is a schematic perspective side view and a partial axial cross-section view of the device of FIG. 2 in a connected state.

The circumference over which the pin extends has a diameter that is inferior to the external diameter of the groove 26, so that the larger part of the pin is completely housed in the groove, as seen in FIGS. 5 and 6.

The bottom of the groove 26 of the female connector 14 features through holes 28 for the radial passage of the internal parts 16a1, 16b1, 16c1. The connector 14 therefore comprises three through holes 28 in the featured example, of which the receiving hole of the part 16a1 is seen in FIGS. 1 and 7, and the receiving hole of the part 16c1 is seen in FIG. 5. A hole 28 is shown on a larger scale in FIG. 9. The groove 26 and the holes 28 are here located on the part 14b of the connector 14.

Figure 3:
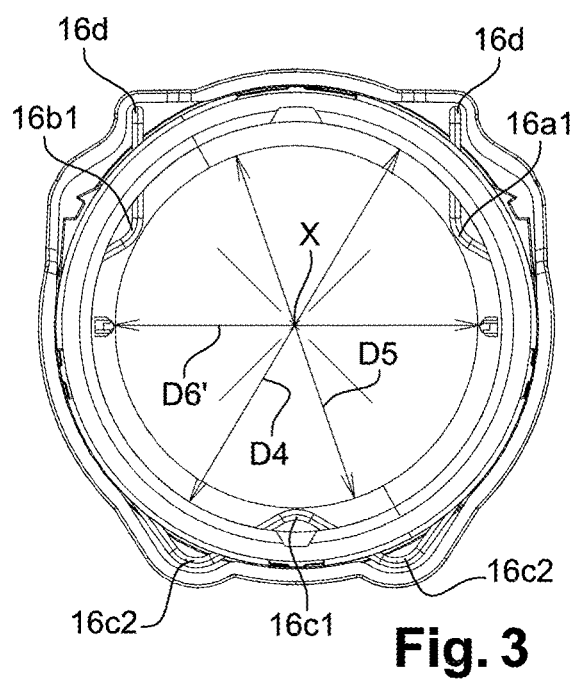
FIG. 3 is a schematic front view of the device of FIG. 1 without the male connector, and showing a radial position, in this case an external position, of elements supported by the female connector.
Figure 4:
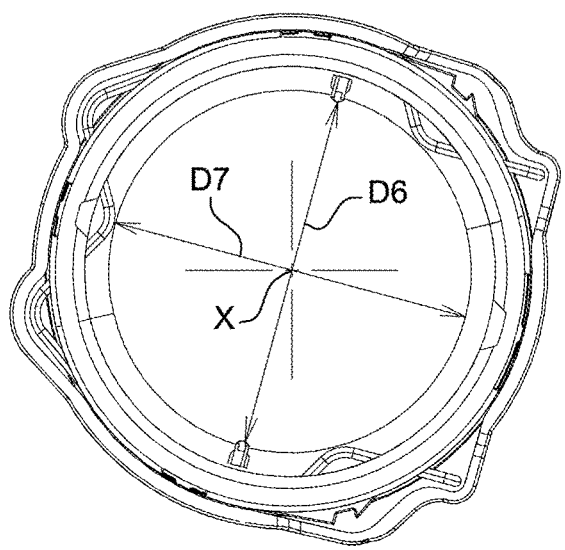
FIG. 4 is a schematic front view of the device of FIG. 2 without the male connector, and showing a radial position, in this case an internal position, of elements supported by the female connector.

The FIGS. 3 and 4 show the internal parts 16a1, 16b1, 16c1 that pass through the holes 28 of the female connector 14. These parts feature a minimal internal diameter referenced D7. The parts 161a, 16b1, 16c1 provide the pin with a degree of elastic flexibility by pushing apart or bringing closer its side portions, substantially in a plane containing the pin, which is a plane perpendicular to the axis X.

The ends 16d cooperate by bearing circumferentially against complementary abutments 14e of the connector 14 (FIG. 1) so as to rotationally immobilise the pin 16 on the connector 14 and in the groove 26.

The diameter D7 is less than the diameter D4 and the diameter D1. The diameter D7 is preferably greater or equal to the diameter D2. When the connector 12 is inserted in the connector 14, the parts 16a1, 16b1, 16c1 are designed to cooperate by sliding of their summits possibly on the part 12c, to ensure the centring of the connectors when they are inserted into one another. The parts then cooperate by sliding with the ramp 22. A part of the force applied to the connector 14 to insert it in the connector 12 is transmitted by the ramp 22 to the parts 16a1, 16b1, 16c1, which causes an elastic deformation of the pin. This elastic deformation translates into a widening of the internal diameter D7 of the pin until it reaches the diameter D1 of the part 12b, when the parts slide to this part. All that is then left to do is to continue the motion of the connector until the parts 16a1, 16b1, 16c1 are inserted by return and elastic snap-fitting in the groove 20 of the male connector 12. This position is shown in FIG. 6 and corresponds to the correct insertion position of the connectors 12, 14. In this position, the abovementioned plane containing the pin 16 substantially passes at the level of the groove 20.

Although this is not shown, the connector 14 could also comprise means to cooperate with the pin 16 to make it captive of and fully secured to the connector.

In the featured example, the device 10 comprises two locating pins 18, but it could also include more locating pins. The locating pins 18 are located diametrically opposite one another and are generally nail-shaped in this example.

Figure 10:
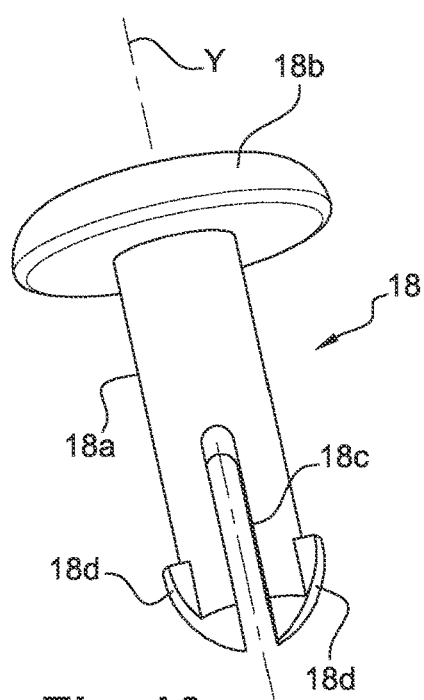
FIG. 10 is a schematic perspective view of a locating pin-type element of the device of FIGS. 1 and 2.

A locating pin 18 is shown on a larger scale in FIG. 10 and comprises a rod 18a that is substantially cylindrical and with an axis Y, and a head 18b located at a longitudinal end of the rod 18a. In a version (not shown) where the locating pin has a dumbbell shape, it would include a head at each of the longitudinal ends of a rod.

In the featured example, the rod 18a is split and comprises a slot 18c that extends along the axis Y, for example to the middle of its length. The slot 18c divides the free end of the rod 18a in two parts that are slightly deformable elastically by bending and that each feature an engagement tooth 18d. The teeth 18d are here diametrically opposite one another and oriented outwards with respect to the axis Y. The head 18b has a generally flat shape with a circular periphery, the summit of which, opposite the rod 18a, is slightly domed or rounded.

Each locating pin 18 is housed in a radial through-orifice 30 of the female connector 14 opening onto the ramp 24. The connector 14 therefore comprises two orifices 30, diametrically opposite one another, for receiving the locating pins 18.

Figure 9:
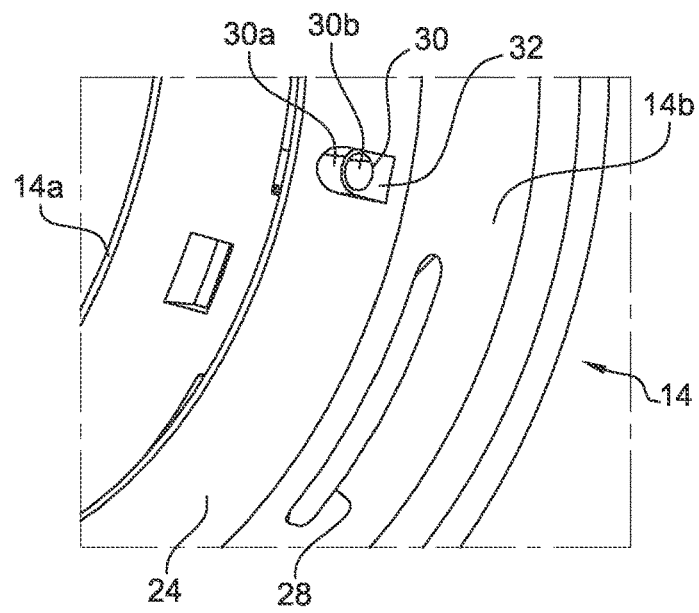
FIG. 9 is a view on a larger scale of a part of the female connector of the device of FIGS. 1 and 2.

Each orifice 30 comprises three parts, respectively an internal part 30a, an intermediate part 30b and an external part 30c. The external part 30c of the orifice 30 is a cylindrical housing with a diameter D8 that radially opens outwards onto the external periphery of the connector 14 (FIGS. 5 and 6). The intermediate part 30b is a cylindrical housing with a diameter D9, smaller than D8, and it extends between the parts 30a, 30c (FIGS. 5 and 6). The parts 30b, 30c are coaxial. The part 30a opens onto the ramp 24 and defines a peripheral bearing surface 32 around the outlet of the part 30b (FIG. 9).

As can be seen in FIGS. 5 and 6, each locating pin 18 is mounted in an orifice 30 so that its head 18b is located in the part 30c, its rod 18a passes through the part 30b, and its teeth are located in or beyond the part 30a, and are able to bear against the surface 32.

The orifices 30 have a radial orientation and the locating pins 18 are housed in these orifices so that their axes Y extend radially. The locating pins 18 are movable radially in the orifices 30 from an internal position shown in FIGS. 4 and 5 to an external position shown in FIGS. 3 and 6. In the position of FIGS. 4 and 5, the heads 18b radially bear against the radially internal bottom of the parts 30c of the orifices 30, and the free ends of the rods 18a are located on a circumference centred on the axis X, with a diameter D6 (FIG. 4). In the position of FIGS. 3 and 6, the teeth 18d of the locating pins bear against the surface 32 or are close to this surface, and the free ends of the rods 18a are located, in this case, on a circumference with a diameter D6' greater than D6 (FIG. 3). In this position, the heads of the locating pins are located at the radially external end of the parts 30c and their summits are substantially aligned with an external peripheral surface of the connector 14.

The radial motion of the locating pins 18 between these positions is caused by the insertion of the connectors 12, 14 inside one another, the locating pins being designed to cooperate by sliding by their free ends or tips on the male connector 12, and in particular on the ramp 22.

When the connector 12 is inserted in the connector 14, the locating pins 18 can cooperate by sliding with the part 12c, and then with the ramp 22. A part of the force applied to the connector 14 to insert it in the connector 12 is transmitted by the ramp 22 to the locating pins, which moves them radially in their orifices 30 between the abovementioned positions. In the position shown in FIG. 6, wherein the pin 16 is snap-fitted in the groove 20, the locating pins 18 bear against the ramp 22 and are in the abovementioned external position. The axial distance between the pin 16 and the locating pins 18, or between the groove 26 and the orifices 30, is here less than the cumulative length of the groove 20 and of the ramp 22, so as to ensure that the locating pins are correctly positioned on the ramp 22 when the pin 16 is housed in the groove 20.

In the featured example, the slot 18c of each locating pin facilitates its assembly in the orifice 30 by elastic snap-fitting. Each locating pin is indeed inserted in the corresponding orifice by elastic snap-fitting, upon which the parts of the rod supporting the teeth 18d undergo an elastic return along the axis Y in the part 30a after insertion of the locating pin in the orifice 30 from the exterior. The teeth 18d cooperate by abutment with the surface 32, thereby rendering the locating pins captive.

The locating pins 18 are for example made of polyamide.

Figure 8:
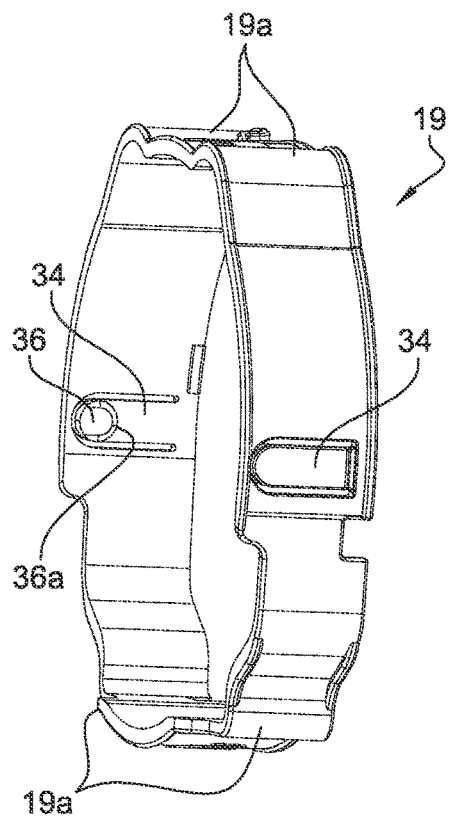
FIG. 8 is a schematic perspective view of the ring of the device of FIGS. 1 and 2.

The ring 19 is better seen in FIG. 8. It has a general annular shape and is mounted around the female connector 14. It can be moved on the connector 14 between two axial positions, respectively a rear position shown in FIGS. 1 and 5 and a front position shown in FIGS. 2 and 6. In both positions, it extends around the orifices 30 and the locating pins 18, which are therefore concealed by the ring 19. In its rear position, it releases the pin 16, which can freely undergo elastic deformation in a radial direction, under the action of the ramp 22. In its front position, it covers the pin 16, which cannot undergo elastic deformation, or is at least limited in its elastic deformations.

As seen in FIGS. 3 and 4, the ring 19 does not have, in the shown example, a perfectly cylindrical shape as it is configured to fit, with a clearance, with the shape of the pin when it extends around the latter. The ring therefore comprises bosses 19a designed to extend, on one hand, around the side parts 16c2 and, on the other hand, around the ends 16d. The ring 19 is designed to be rotationally blocked with respect to the connector 14.

The ring 19 further comprises tabs 34 that are elastically deformable in a radial direction, and configured to cooperate with the connector 14 to immobilise the ring on the latter in an axial direction.

The ring comprises two tabs 34 diametrically opposite one another in the featured example. Each tab 34 is formed in the thickness of the ring. Each tab 34 has a general elongated shape in an axial direction and comprises a longitudinal end, in this case a rear end, connected to the rest of the ring, and an opposite end, therefore a front end, which is free and formed from a single part with a skid 36 protruding radially outwards. The radial distance between the skids 36 is inferior to the internal diameter of the ring 19. The internal diameter of the ring is slightly greater than the external diameter of the connector 14, so as to be able to slide axially on the latter.

Each skid 36 has a general cylindrical shape, with a diameter less than the diameter D8. The skids are configured to be housed in the parts 30c of the orifices 30, when the locating pins are in their internal radial position (FIG. 5), and to be taken out of these orifices when the heads 18b of the locating pins bear against these skids (FIG. 6). The tabs are therefore elastically deformable by bending in a radial plane, between free unconstrained positions shown in FIG. 5, wherein the skids 36 are located in the parts 30c of the orifices 30, and constrained positions where they are radially deformed outwards and where the skids 36 are out of the orifices 30.

In the position of FIG. 5, the skids 36 cooperate by axial abutment with the peripheral edges of the orifices 30 and the ring 19 is prevented from moving axially on the connector 14. In the position of FIG. 6, the ring has been moved on the connector 14 above the pin 16 for its locking, i.e. so as to prevent it from expanding radially and exiting the groove 20. The pin 16 can therefore be fully concealed by the ring 19. It should therefore be understood that an operator can only move the ring in order to lock the pin if the connectors are properly inserted into one another until snap-fitting of the pin in the groove of the connector 12.

Figure 11:
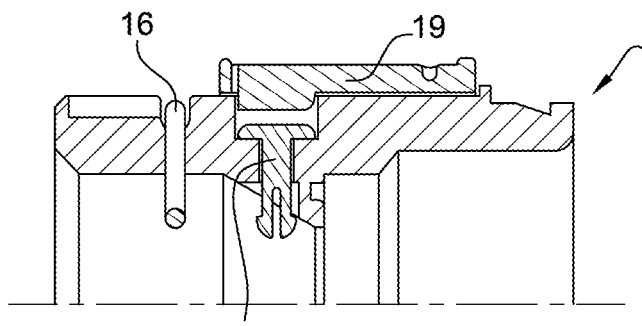
FIGS. 11 to 15 are partial schematic and axial cross-section views of the device of FIGS. 1 and 2, showing the connection steps of the female connector on the male connector.

FIGS. 11 to 15 show the abovementioned steps for the assembly of the connectors by insertion. The female connection is shown in FIG. 11, with the locating pins 18 and the pin 16 in unconstrained positions, and with the ring 19 in a rear position. The male connector 12 is inserted in the female connector 14 in FIG. 12. The pin 16 starts to cooperate with the ramp 22 as the locating pins 18 slide on the part 12c of the connector 12. The motion of the connector 12 into the connector 14 continues, and the pin 16 is then located on the part 12b as the locating pins 18 start cooperating with the ramp 22. The motion of the connector 12 in the connector 14 continues, the pin 16 is inserted by elastic return in the groove 20 of the connector and the locating pins 18 are moved radially outwards in their orifices 30, which causes an elastic deformation of the tabs 34, of which the skids 36 exit the orifices 30. The connectors 12, 14 are then correctly inserted into one another, and the operator can simply lock this insertion by moving the ring 19 to its front position shown in FIG. 15, wherein it extends over the pin 16. In this position, the tabs 34 can return to their unconstrained position by providing on the ring, just after the groove 20 for the housing of the pin 16 in the forward direction of the ring, housings 38 to receive the skids. One of these housings 38 is shown in FIG. 1.

Figure 14:
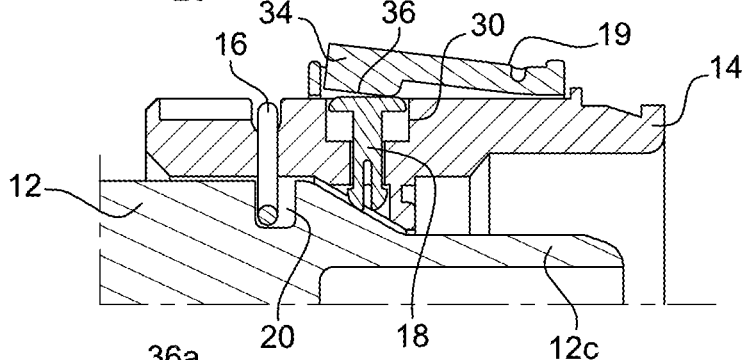
Figure 15:
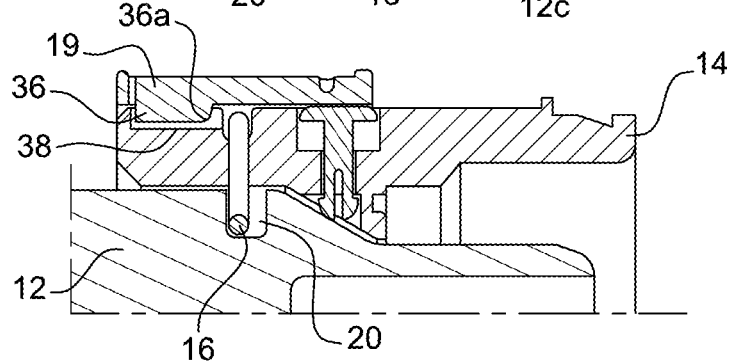

If the operator has to unlock and remove the device 10, he has to repeat the abovementioned steps in the reverse order, the first disassembly step being to exert an axial traction force on the ring to move it from its front positions shown in FIG. 15 to its rear position shown in FIG. 14. This force must be sufficient to cause the deformation of the tabs and extract the skids 36 from the housings 38. To facilitate this step, the rear ends 36a of the skids 36 that can be designed to cooperate directly with the pin 16 can be chamfered, as is shown in FIG. 8. In practice however, the device 10 is not designed to be disassembled often.

The alternative embodiment of FIGS. 16 to 19 shows that certain characteristics of the device 10 are optional. This is, in particular, the case for the locating pins 18, which are not necessarily split and do not have to comprise teeth. This is also the case for the pin 16, which can feature a different configuration. This alternative embodiment of FIG. 18 shows that the tabs 34 can have a different orientation and/or length. They can, for example, be oriented transversally or circumferentially with respect to the axis X of the device. The alternative embodiment of FIG. 19 shows that the locating pins 18 can be tilted with respect to a plane perpendicular to the axis X. In the featured example, the elongation axis of each locating pin, and therefore the axis of motion of the locating pin, is substantially perpendicular to the point or to the bearing surface of this locating pin on the ramp 22. The orifices 30 receiving these locating pins naturally feature a similar orientation. Furthermore, the locating pin can be arranged head to tail, and have its head 18b on the side of the connector 12, and therefore its tip and its teeth 18c on the opposite side, and therefore on the side of the ring and of the tabs 34. In this case, it is the tips of the locating pins that are designed to cooperate with the tabs and cause their deformation.

As mentioned above, the device according to the present disclosure aids the proper connection of the connectors 12, 14. In the event of a bad assembly of the connectors, it is not possible to move the ring 19 axially on the female connector 14.

There are several cases of bad assembly. In the first case, the male connector is not inserted in the female connector. The locating pins 18 are therefore in their radially internal positions and the ring 19 is prevented from moving axially on the female connector because of the cooperation of its skids 36 with the female connector. Other cases relate to improper axial positioning of the male connector inside the female connector. These incorrect positions include one where the locating pins bear against the skids 36 and elastically deform the tabs 34 of the ring, which is axially released on the female connector, and where the pin 16 is not yet snap-fitted in the groove 20. This case is shown in FIG. 20. The axial motion of the ring 19 is then limited by the pin 16. The ring can therefore not reach its locking position of the pin as it cannot be moved to the axial position where it covers the pin.

Figure 12:
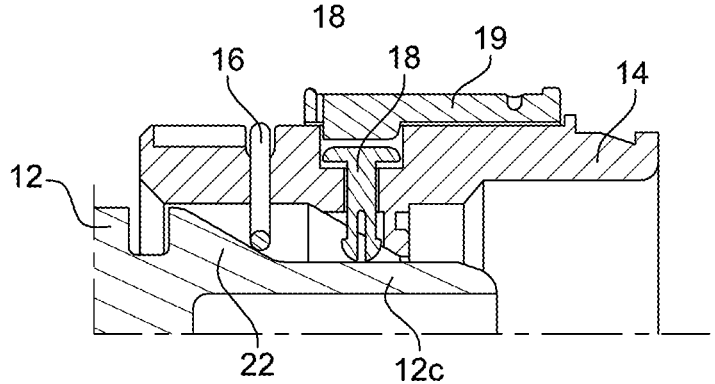
Figure 13:
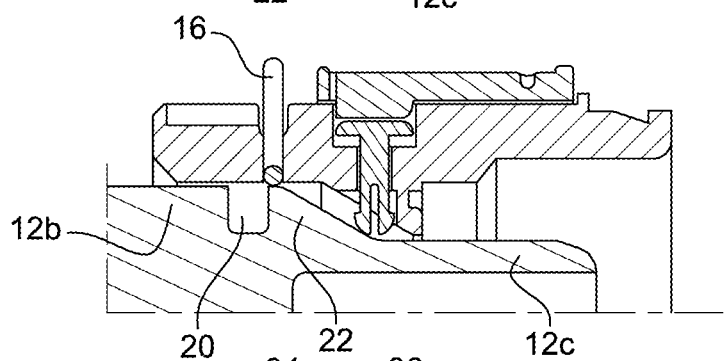

The step shown in FIG. 20 can be inserted between the steps of FIGS. 12 and 13.

The FIGS. 21 and 22 feature an alternative embodiment of the device, which comprises in this case a visual mark 40 on the female connector 14. The visual mark 40 is for example a colour mark, an engraved mark, a symbol, text, etc. It is preferably located on the external periphery of the connector 14 on the path of motion of the ring 19. The ring is configured to be able to cover and conceal the visual mark 40, in particular when it is in the release position of the pin 16. When the ring 19 is in the locking position of the pin 19, the visual mark 40 can be seen by an operator, which ensures that the connection between the connectors 12, 14 is correct. In the featured example, the visual mark 40 is in the form of a thick annular line that extends around the entire periphery of the female connector 14.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A fluid connection device, comprising:
   a male connector and a female connector configured to be co-inserted along an axis X;
   an elastically-deformable pin having a substantially U or C shape mounted on the female connector, the elastically-deformable pin having at least one portion intersecting with the female connector and configured to cooperate by elastic snap-fitting with the male connector; and a movable ring that is displaced axially on the female connector, from a pin release position, to a locking position of the elastically-deformable pin and the connectors, wherein the female connector supports mobile elements displaced radially from a first radial position, wherein the ring is immobilized on the female connector, to a second radial position, wherein the ring is released, and wherein the elements are configured to cooperate both with the male connector and the ring to release the ring when the elastically-deformable pin is snap-fitted onto the male connector.

2. The fluid connection device of claim 1, wherein the elements are locating pins that feature a generally nail or dumbbell shape.

3. The fluid connection device of claim 2, wherein the locating pins have axes of elongation that extend radially with respect to the axis X.

4. The fluid connection device of claim 1, wherein the elements are locating pins, and wherein the locating pins each have a head configured to cooperate with the ring and a tip configured to cooperate with the male connector, or conversely.

5. The fluid connection device of claim 1, wherein the elastically-deformable pin is configured to limit the motion of the ring on the female connector, when the pin is not in a snap-fitted position, and when the elements are in the second position.

6. The fluid connection device of claim 1, wherein the male connector comprises a cylindrical portion connected to a minor diameter end of a frustoconical ramp having a greater diameter end connected to an annular groove, the elastically-deformable pin configured to cooperate by sliding with the ramp and by elastic snap-fitting with the groove, and wherein the elements are configured to cooperate by sliding with the ramp.

7. The fluid connection device of claim 1, wherein the ring comprises locking tabs that are elastically deformable, from a free unconstrained position wherein the locking tabs axially block the ring on the female connector, to a position of constraint by the elements, wherein the locking tabs permit the displacement of the ring on the female connector.

8. The fluid connection device of claim 7, wherein the tabs have an elongated shape in an axial direction.

9. The fluid connection device of claim 7, wherein the elements are locating pins, and wherein the locking tabs comprise, at their free ends, skids that are housed with heads of the locating pins in housings that feature a shape that fits with the female connector, and that are radially movable in the housings.

10. The fluid connection device of claim 1, wherein the elastically-deformable pin is at an axial distance from the elements, said axial distance being less than the length of the ring, the length of the ring being less than the length of the female connector.

11. The fluid connection device of claim 1, wherein the ring is configured to be able to cover and conceal the elastically-deformable pin and the elements.

12. The fluid connection device of claim 11, wherein the ring is configured to be able to cover and conceal the elastically-deformable pin and the elements in the locking position.

13. The fluid connection device of claim 1, wherein the female connector comprises a visual mark and the ring is configured to cover and conceal this visual mark.

14. The fluid connection device of claim 13, wherein the ring is configured to cover and conceal this visual mark in the release position.

15. The fluid connection device of claim 1, wherein the elastically-deformable pin is formed by an elastic element selected from the group consisting of a metal, a plastic wire, and combinations thereof.

16. The fluid connection device of claim 1, wherein the first radial position is an internally radial position and the second radial position is an externally radial position.

* * * * *